(12) United States Patent
Skyman et al.

(10) Patent No.: US 8,483,202 B2
(45) Date of Patent: Jul. 9, 2013

(54) METHOD FOR MOVING QUANTIZATION NOISE INTRODUCED IN FIXED-POINT CALCULATION OF FAST FOURIER TRANSFORMS

(75) Inventors: Anders Skyman, Bohus (SE); Henrik Sahlin, Mölnlycke (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 289 days.

(21) Appl. No.: 12/994,289

(22) PCT Filed: May 23, 2008

(86) PCT No.: PCT/SE2008/050610
§ 371 (c)(1),
(2), (4) Date: Nov. 23, 2010

(87) PCT Pub. No.: WO2009/142563
PCT Pub. Date: Nov. 26, 2009

(65) Prior Publication Data
US 2011/0069694 A1    Mar. 24, 2011

(51) Int. Cl.
*H04J 1/00*    (2006.01)
(52) U.S. Cl.
USPC ........... 370/343; 370/330; 370/329; 370/336; 370/328; 370/344; 375/219; 375/260; 375/295

(58) Field of Classification Search
USPC ...... 375/260; 370/328, 445, 208; 340/870.03; 704/500; 330/251
See application file for complete search history.

(56) References Cited

U.S. PATENT DOCUMENTS

| | | | |
|---|---|---|---|
| 2005/0174931 A1* | 8/2005 | Krishnamoorthi | 370/208 |
| 2006/0074693 A1* | 4/2006 | Yamashita | 704/500 |
| 2006/0193393 A1* | 8/2006 | Shen et al. | 375/260 |
| 2008/0001779 A1* | 1/2008 | Cahill-O'Brien et al. | 340/870.03 |
| 2008/0150635 A1* | 6/2008 | Maejima | 330/251 |
| 2009/0080454 A1* | 3/2009 | Koyanagi | 370/445 |
| 2010/0189040 A1* | 7/2010 | You et al. | 370/328 |

* cited by examiner

*Primary Examiner* — Andrew Lai
*Assistant Examiner* — Jamaal Henson

(57) ABSTRACT

The invention discloses a method in an electronic communication device for processing a digital signal within a wireless communication network in order to transform the digital signal from a first domain representation to a second domain representation in a communication device, comprising the steps of: transforming the signal from the first domain to the second domain resulting in a signal of a first order of values with quantization noise in at least one area of the second domain, and performing a cyclic shift on the transformed signal to move the quantization noise in the second domain, resulting in a first shifted signal.

14 Claims, 12 Drawing Sheets

METHOD FOR MOVING QUANTIZATION NOISE INTRODUCED IN FIXED-POINT CALCULATION OF FAST FOURIER TRANSFORMS

TECHNICAL FIELD

The invention relates to a method and devices within a communications network. In particular, the invention relates to process a digital signal in a wireless communication network.

BACKGROUND

In the long term evolution (LTE) of 3GPP, a new flexible air interface is currently being standardized. The LTE system will provide spectrum flexibility in the sense that carrier bandwidths varying between 1.25 MHz and 20 MHz may be handled, and both Frequency Division Duplex, FDD, and Time Division Duplex, TDD, is supported in order to be able to use both paired and unpaired spectrum. LTE is expected to be smooth evolution path for 3G standards such as WCDMA, TD-CDMA and TD-SCDMA. LTE is also expected to offer significant performance improvements as compared to current 3G standards by using, for example, various advanced antenna techniques.

In the downlink of LTE, the physical layer is based on Orthogonal Frequency Division Multiplex, OFDM. Here the information to be transmitted is coded, for example, by using turbo codes, interleaved, modulated to signal constellations of various orders, for example, QPSK, 16 QAM, 64 QAM or the like, and fed to an inverse Fast Fourier Transform (IFFT). This IFFT is a transform from a frequency domain representation of the symbols to be transmitted to a time domain representation.

In the uplink of LTE, the physical layer is based on Single Carrier-Frequency Division Multiple Access, SC-FDMA, which is also referred to as pre-coded OFDM. This means that the physical channels are built of SC-FDMA symbols. Here, the modulated symbols are transformed to the frequency domain by a Discrete Fourier Transform, DFT, of the same size as the number of modulated symbols of each SC-FDMA symbol. This is then fed to a larger IFFT with a size which depends on the bandwidth of the radio communication link.

This way, several users may be scheduled to transmit simultaneously, typically on different parts of the frequency band in a TDMA/FDMA fashion.

In the receivers of downlink and uplink the received signal is fed to a Fast Fourier Transform, FFT. This FFT enables a frequency domain extraction of each user such that the symbols for each user may be demodulated and decoded independently.

Whenever a DFT (implemented as an FFT) is used by a base station receiver on a time domain signal, said time domain signal is assumed to be periodic with period time equal to the length of the DFT. In order to ensure this for signals subject to dispersive channels, a cyclic prefix may be used. The cyclic prefix must have a length that is larger, or equal to, the delay spread of the uplink communication channel.

All these FFT:s are preferable implemented with fixed point calculations, such that the calculations can be done in cheap hardware with low power consumptions.

However, when an FFT/IFFT is calculated with fixed point calculations, a quantization noise occurs in the result. This quantization noise is larger in some regions compared to others and may deteriorate the performance of system.

SUMMARY

Some embodiments are provided to reduce the impact of the quantization noise.

The invention relates to a method in an electronic communication device for processing a digital signal within a wireless communication network in order to transform the digital signal from a first domain representation to a second domain representation. The method comprises the steps of transforming the signal from the first domain to the second domain resulting in a signal of a first order of values with quantization noise in at least one area of the second domain, and performing a cyclic shift on the transformed signal to move the quantization noise in the second domain, resulting in a first shifted signal.

Thereby, the quantization noise may be moved to a less used area of the second domain.

Furthermore, an electronic communication device is provided comprising a receiving unit arranged to receive data on a carrier signal and a control unit arranged to process the carrier signal by transforming the carrier signal from a time domain to a frequency domain The control unit is further arranged to perform a first cyclic shift on the processed carrier signal resulting in a first shifted signal with quantization noise from the transforming moved in the frequency domain.

In addition, an electronic communication device is provided comprising a transmitting unit arranged to transmit data on a carrier signal and a control unit arranged to process the carrier signal before transmission by transforming the carrier signal from a frequency domain representation to a time domain representation. The control unit is further arranged to perform a cyclic shift on the processed carrier signal and thereby move quantization noise from the transforming in the time domain, resulting in a first shifted transmission signal.

BRIEF DESCRIPTION OF THE DRAWINGS

Embodiments will now be described in more detail in relation to the enclosed drawings, in which.

DETAILED DESCRIPTION OF EMBODIMENTS

Figures 1, 2:
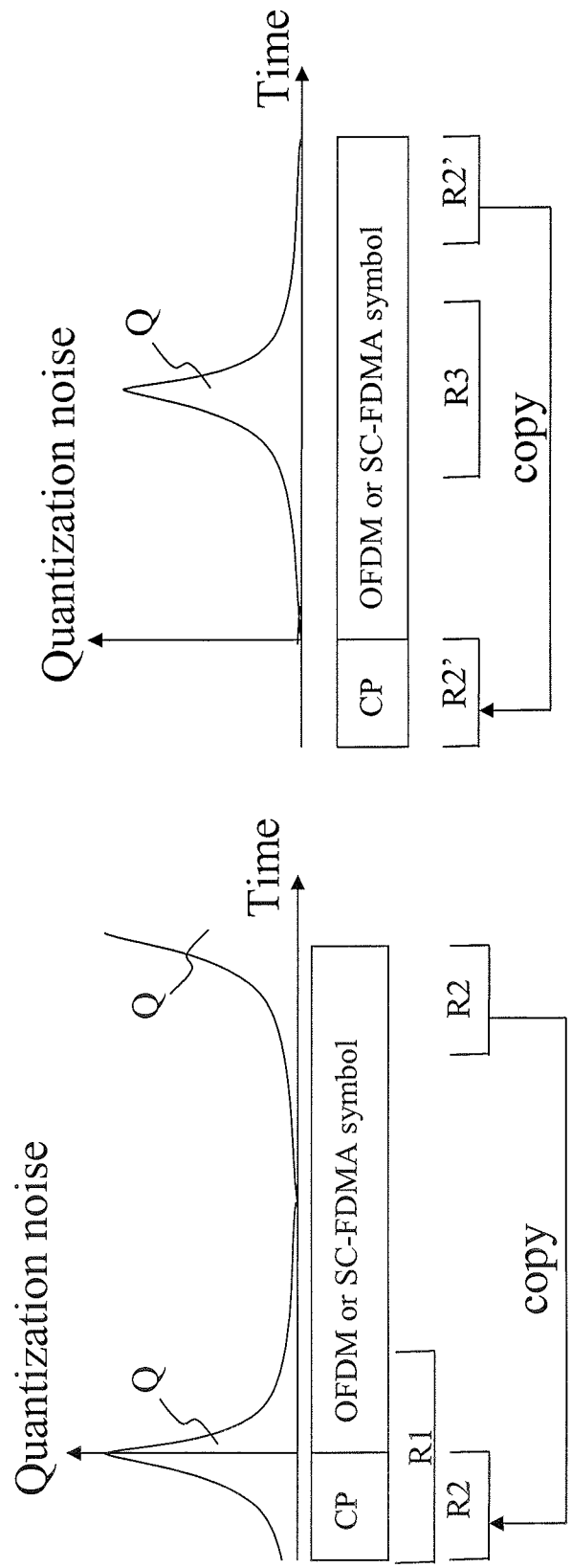
FIG. 1 shows a schematic graph of quantization noise relative time.
FIG. 2 shows a schematic graph of quantization noise relative time.

The present invention now will be described more fully with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

As used herein, the term "comprising" or "comprises" is open-ended, and includes one or more stated features, integers, elements, steps, components or functions but does not preclude the presence or addition of one or more other features, integers, elements, steps, components, functions or groups thereof.

As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Furthermore, "coupled" or "connected" as used herein may include wirelessly coupled or connected.

Well-known functions or constructions may not be described in detail for brevity and/or clarity.

The present invention may be embodied as methods, electronic devices, and/or computer program products. Accordingly, the present invention may be embodied in hardware and/or in software (including firmware, resident software, micro-code, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

Embodiments according to the present invention are described with reference to block diagrams and/or operational illustrations of methods and communication terminals.

In this regard, each block may represent a module, segment, or portion of code, which comprises one or more executable instructions for implementing the specified logical function(s). It is to be understood that each block of the block diagrams and/or operational illustrations, and combinations of blocks in the block diagrams and/or operational illustrations, can be implemented by radio frequency, analog and/or digital hardware, and/or program instructions. These program instructions may be provided to a controller, which may include one or more general purpose processors, special purpose processors, ASICs, and/or other programmable data processing apparatus, such that the instructions, which execute via the controller and/or other programmable data processing apparatus, create means for implementing the functions/acts specified in the block diagrams and/or operational block or blocks.

In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language and/or a lower level assembler language. It will be further appreciated that the functionality of any or all of the program modules may also be implemented using discrete hardware components, one or more application specific integrated circuits (ASICs), or a programmed digital signal processor or microcontroller.

As used herein, "electronic component" means an active device as contrasted with a passive electrical connector or the like. An electronic component may include a processor.

As used herein, an "electronic communication device" includes, but is not limited to, a terminal that is configured to receive/transmit communication signals via a wireline connection, such as via a public-switched telephone network (PSTN), digital subscriber line (DSL), digital cable, or another data connection/network, and/or via a wireless interface with, for example, a cellular network, a satellite network, a wireless local area network (WLAN), and/or another communication terminal.

An electronic communication device may be any electronic communication device being part of a communications network such as a base station, evolved nodeB, wireless communication terminal or the like.

Examples of wireless communication terminals include, but are not limited to, a cellular telephone, personal data assistant (PDA), pager, and/or a computer that is configured to communicate data over a wireless communication interface that can include a cellular telephone interface, a Bluetooth interface, a wireless local area network interface (e.g., 802.11), another RF communication interface, and/or an optical/infra-red communication interface.

As used herein, "mobile terminals" may be portable, transportable, installed in a vehicle (aeronautical, maritime, or land-based), or situated and/or configured to operate locally and/or in a distributed fashion at any other location(s) on earth and/or in space.

A control unit may be a single processor or a multiple arrangement comprising a number of processors or the like.

In FIG. 1, quantization noise as a function of time is shown after an IFFT process. The IFFT results in a region R1 with increased quantization noise Q that occurs on and in the region around time zero A cyclic prefix CP is a part of the last samples of the OFDM symbol which is copied and repeated before the OFDM symbol shown as an arrow in FIG. 1. Thus, a region R2 with large quantization noise Q is transmitted twice. In many receiver algorithms, the cyclic prefix CP and the last part of the transmitted OFDM symbol are used. In some algorithms the first part of the cyclic prefix is used to make a spectrum control transaction between OFDM symbols.

In FIG. 2, a cyclic shift has been performed on the signal after an IFFT and the quantization noise Q is moved to a region R3 where it has small impact on the OFDM symbol. In a transmitter of an OFDM based system, the signal may be shifted after the IFFT with an amount which is significantly larger than the cyclic prefix, CP. Preferably, the signal is shifted half the length of the OFDM symbol resulting in that the region R3 with large quantization noise is placed in the middle of the OFDM symbol, and the cyclic prefix is taken from a region R2' with low quantization noise. The noisy region R3 is thereby in a region that does not deteriorate the symbol/signal.

The cyclic shift may be performed by reading the signal in a predetermined order or the signal may be stored in a memory and read from the memory in a predetermined order, for example, in the opposite order as it was written or the like, changing the order of the signal and thereby moving the quantization noise.

Figures 3, 4:
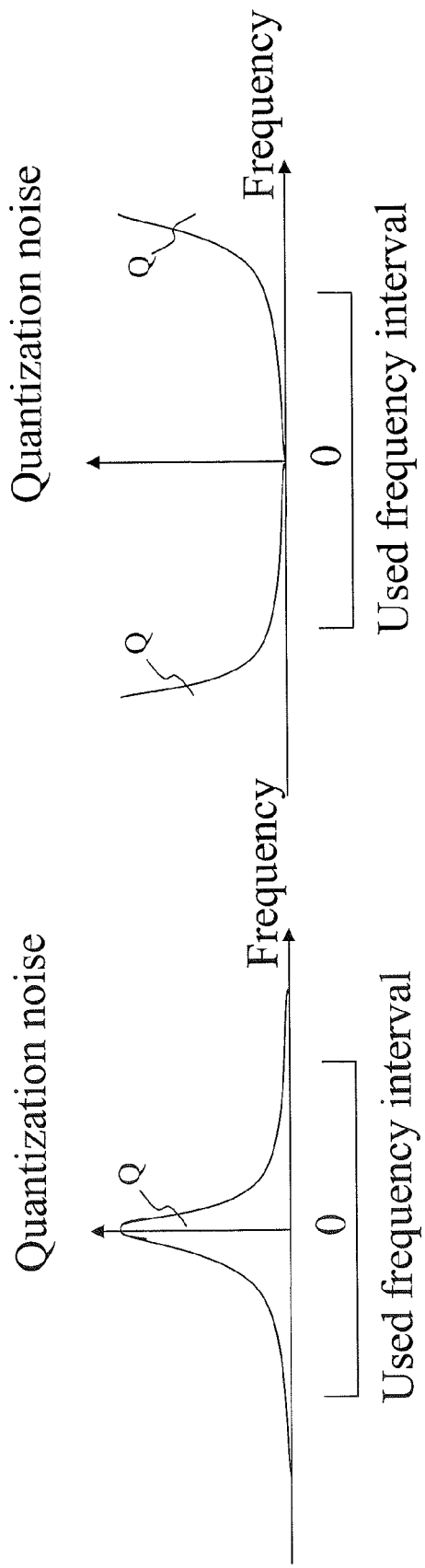
FIG. 3 shows a schematic graph of quantization noise relative frequency.
FIG. 4 shows a schematic graph of quantization noise relative frequency.

FIG. 3 shows quantization noise as a function of frequency after an FFT process. An FFT results in a region around zero frequency that has an increased quantization noise Q. This region will be used as a carrier frequency and noise results in a deteriorated symbol.

In FIG. 4, the high quantization noise is moved from a carrier frequency to a sub-carrier frequency by cyclic shift after an FFT. The quantization noise Q does therefore not inflict on the signal as much.

Embodiments illustrate the cyclic shift in exemplary system, such as OFDM and SC-FDMA symbol construction which are compliant with LTE, OFDM and SC-FDMA for a future wireless communication system, FFT and IFFT in receiver of a wireless communication system and/or the like.

Figure 5:
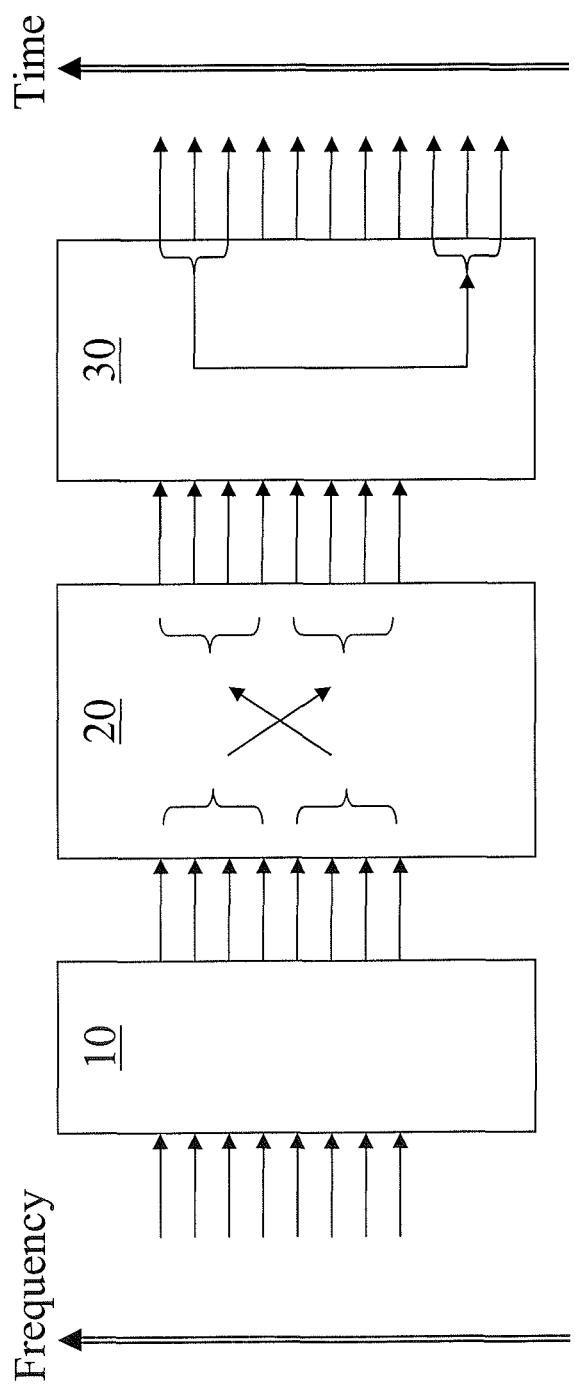
FIG. 5 shows a schematic overview of a symbol construction.

In FIG. 5, an embodiment of a system is shown wherein IFFT 10 is performed in a transmitter without frequency domain rotation. The cyclic shift 20 is performed after the IFFT 10 wherein the signal is read in a different order to move the quantization noise to a region where it does not inflict on the symbol as much, for example, a time part of the symbol not being used or less used. Optionally, the transmitter may comprise a block 30 for adding CP to the symbol to conclude a continuous signal.

Figure 6:
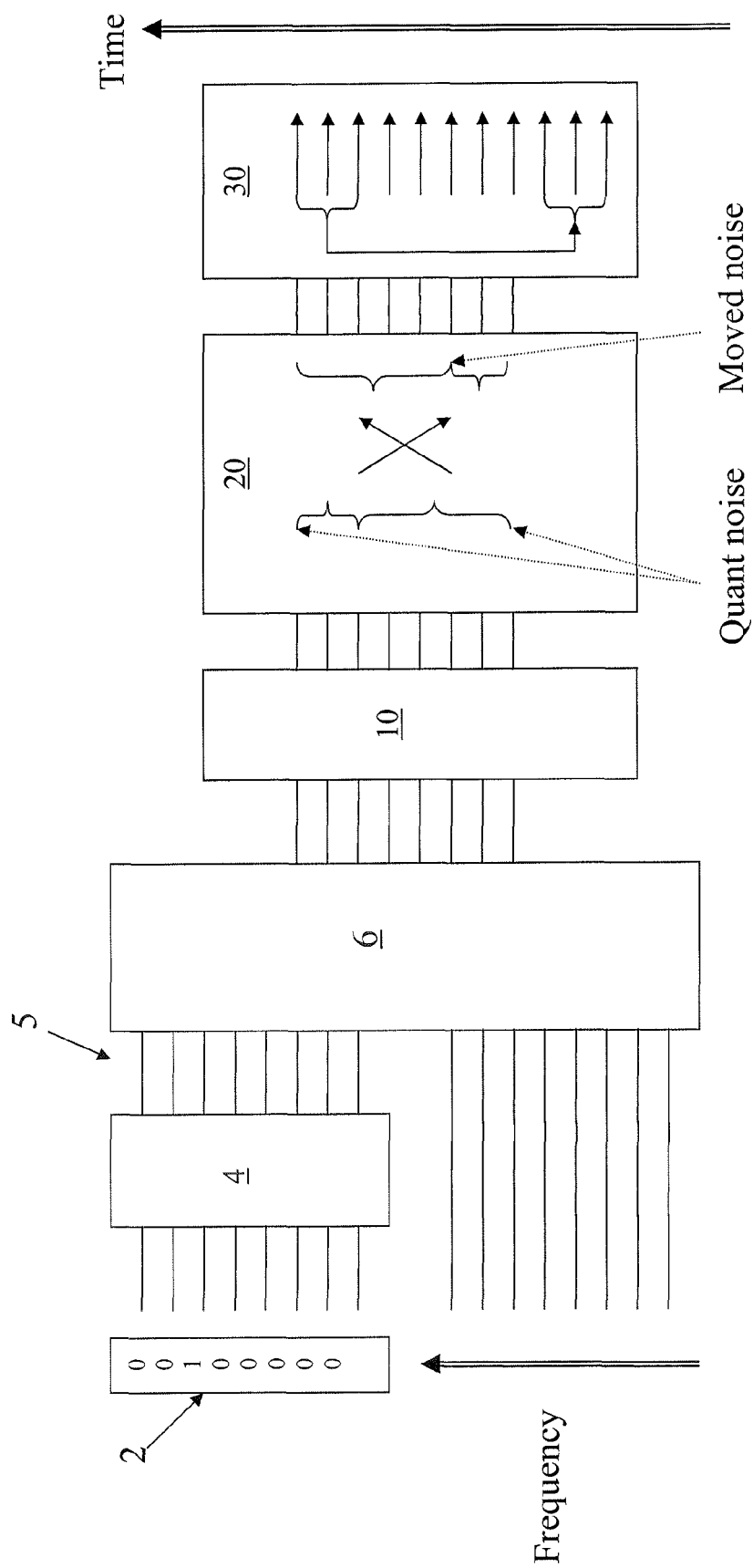
FIG. 6 shows a schematic overview of functional blocks within a transmitter.

In FIG. 6, an OFDM and SC-OFDM symbol construction for LTE is shown. In a transmitter of an OFDM based system, a rotation is performed in the time domain before the IFFT 10 and a cyclic shift 20 is performed after the IFFT 10 to restore a correct time domain signal. The quantization noise is thereby moved in time to an interval in which it interferes less with transmission and modulation.

The result of an IFFT is cyclic and may therefore be cyclically shifted at any quantity. But here the shift must be quantized by the size of the IFFT. For example, an IFFT size of 8 points limits the shift to be in parts of ⅛ of the result.

The rotation that is performed prior to the IFFT is performed with a frequency that corresponds to the selected shift position. The rotation may be performed by an element wise multiplication 6 with a rotation sequence. The rotation sequence may be pre-calculated and may be calculated by an FFT 4 where only the shift position 2 is unity in the input vector and where the other input values are zero. The shift position is mapped to the cyclic shift. The rotation may then be normalized 5 such that it only modifies the phase and not the amplitude in the element wise multiplication. Then the frequency data shall be multiplied with the rotation before the IFFT of frequency data.

Preferably, the shift position equals half the length of the OFDM symbol, see FIG. 2, resulting in that the region R3 with large quantization noise is placed in the middle of the OFDM symbol, and the cyclic prefix is taken from a region R2' with low quantization noise. The noisy region R3 is thereby in a region that does not deteriorate the symbol/signal.

To use an element wise multiplication sequence 6 may also with advantage be included in the symbol modulation.

The IFFT 10 is then performed on the signal resulting in representation of the symbol in the time domain. After the IFFT 10, the time domain data is processed in a cyclic shift 20 according to the selected shift position 2 so that the shift position 2 corresponds to start and end of the signal and the quantization noise is concentrated to one period in time.

OFDM and SC-FDMA symbols may be constructed which are compliant with LTE, with the use of this approach of element wise multiplication with a rotation sequence before IFFT and cyclic shift after IFFT.

If the element wise multiplication with a rotation sequence is excluded before the IFFT, but the cyclic shift after the IFFT is performed, as shown in FIG. 5, OFDM (or SC-FDMA) symbols which is not compliant with LTE, will be constructed. One reason for omitting this rotation sequence is to reduce computational complexity in the transmitter.

This way of calculating OFDM and SC-FDMA symbols results in that transmitted symbols will contain less quantization noise.

Figure 7:
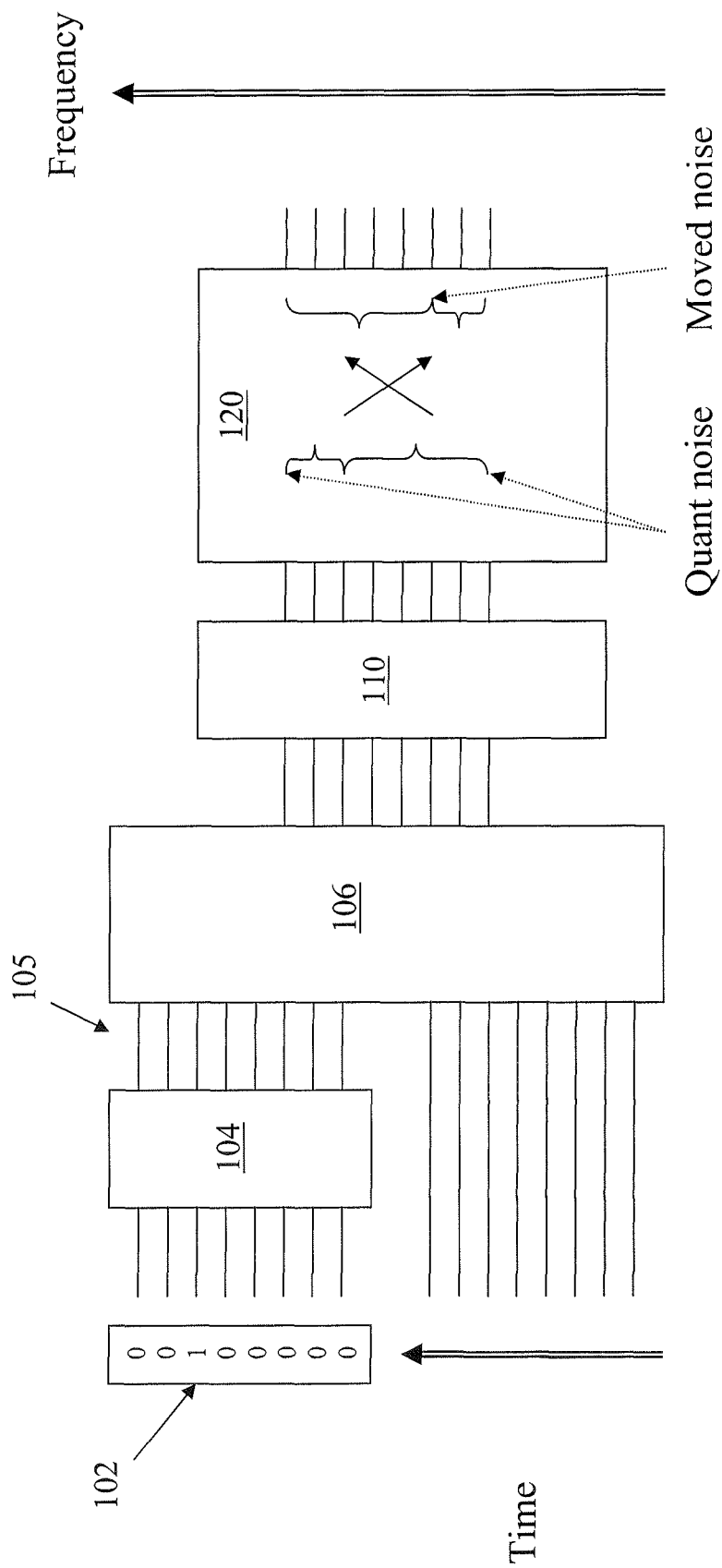
FIG. 7 shows a schematic overview of functional blocks within a receiver.

In FIG. 7, a system is shown wherein FFT and IFFT are performed in receiver algorithms. Embodiments may also be used on the receiver side where the used frequency interval of the transmission is centered on the carrier frequency. Here an FFT 110 is used to transform the information to the frequency domain. With an ordinary FFT, the quantization noise will be largest in an interval around the carrier frequency. But by using an element wise multiplication 106 with a rotation sequence before FFT 110 and cyclic shift 120 after FFT the noise may be shifted out of the used frequency interval, see FIG. 4 to a sub-carrier frequency not or less used.

The rotation sequence is similarly calculated as in the transmitter case. That is, the rotation that is performed prior to the FFT 110 is performed with a time slot that corresponds to a selected shift position 102. The rotation sequence may be pre-calculated and may be calculated by an IFFT 104 where only the shift position 102 is unity in the input frequency and where the other input values are zero. The shift position 102 is mapped to the cyclic shift 120. The rotation may then be normalized 105 such that it only modifies the phase and not the amplitude in the element wise multiplication. Then the time domain data shall be multiplied with the rotation before the FFT of time domain data.

The FFT transform the data in the time domain to data in the frequency domain and a cyclic shift is performed on the data to move the noise from the quantization of the data to a frequency not/less used.

Embodiments result in less fixed point quantization noise in transmitted OFDM and SC-FDMA signals. Embodiments may be included in future OFDM based wireless communication standards, since it provides improved system performance with reduced hardware cost in both mobiles and terminals. Embodiments may also be implemented in receiving arrangements to improve performance of receiver algorithms.

Figure 8:
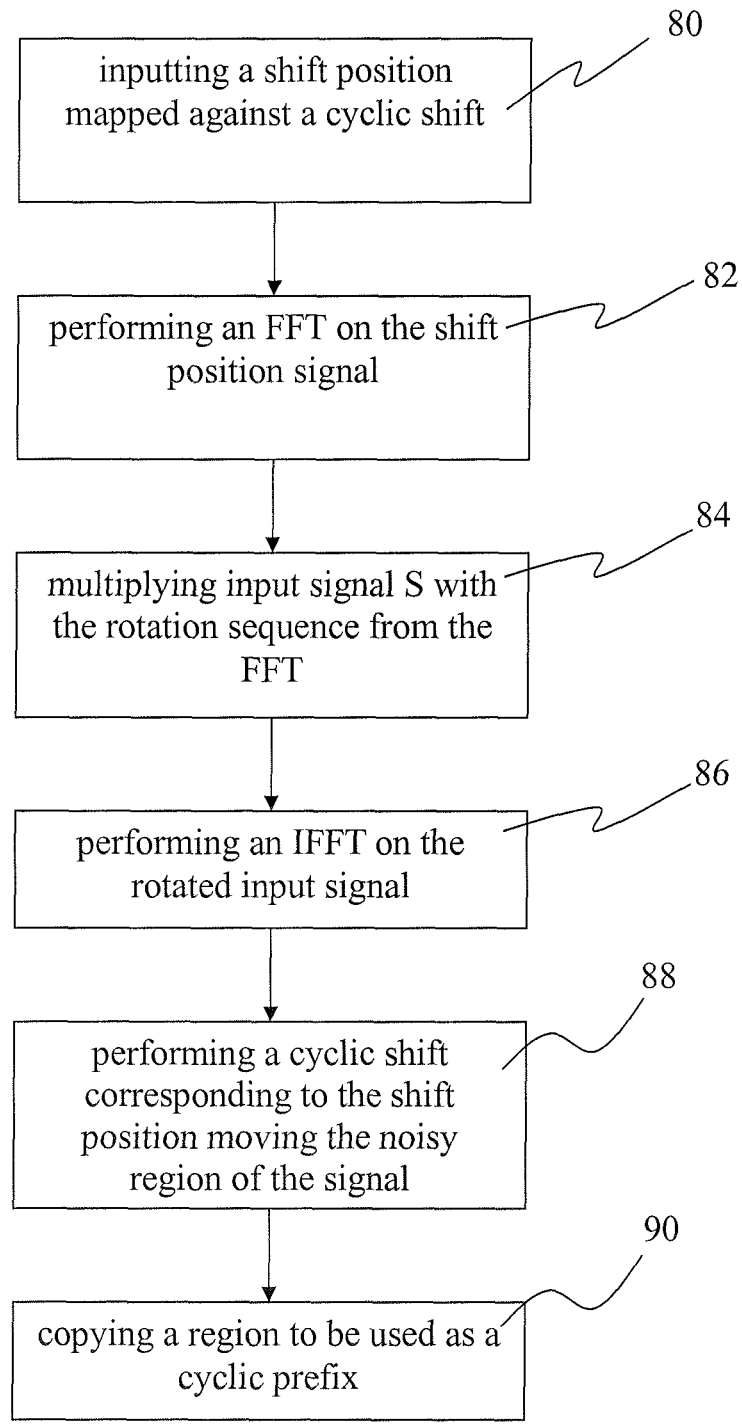
FIG. 8 shows a schematic flow chart of a method in a transmitter in an OFDM system.

FIG. 8 shows a schematic flow chart of a method in an OFDM transmitter.

In optional step 80, a first step of a rotation in a time domain is performed. The step is to input a shift position mapped against the cyclic shift as a vector signal.

In optional step 82, an FFT on the shift position signal is performed resulting in a frequency signal corresponding to the time domain signal, a rotation sequence.

In optional step 84, an element wise multiplication is performed mixing the rotated signal and an input signal S by multiplying the signal S with the rotation sequence from the FFT.

In step 86, an IFFT is performed on the multiplied signal and a cyclic result is obtained in the frequency domain.

In step 88, a cyclic shift corresponding to the shift position is performed on the signal from the IFFT wherein data is shifted relative the frequency data resulting in a de-rotated signal but with a moved quantization noise.

In optional step 90, a region for cyclic prefix is copied in the end of the OFDM symbol having a low quantization noise.

Figure 9:
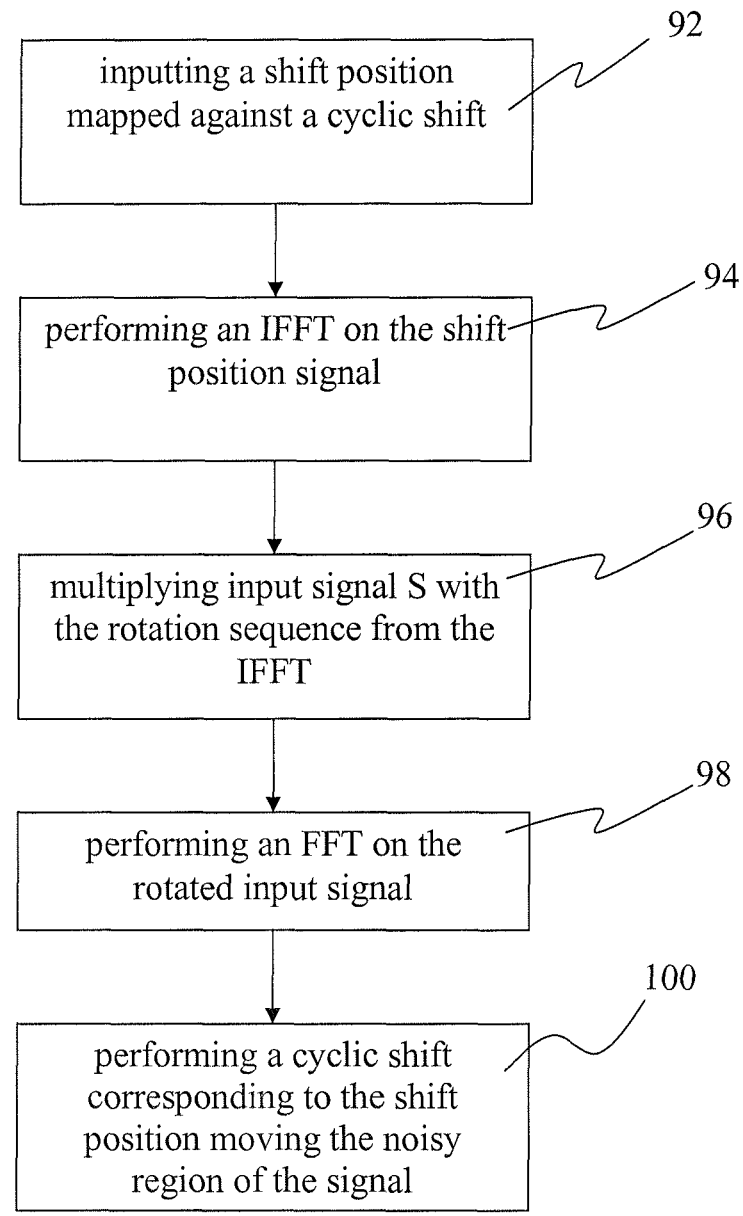
FIG. 9 shows a schematic flow chart of a method in a receiver in an OFDM system.

In FIG. 9, a schematic flow chart in a receiver of an OFDM communication network is shown.

In optional step 92, a shift position is added as a vector signal in order to shift and rotate the signal in accordance with the later cyclic shift. The shift position is fed to the IFFT.

In optional step 94, a transformation is performed from a frequency domain to the time domain using an IFFT. The resulting signal may be normalized.

In optional step 96, an element wise multiplication is performed mixing the rotated signal and an input signal S by multiplying the signal S with the rotation sequence from the IFFT.

In step 98, an FFT is performed on the multiplied signal and a cyclic result is obtained in the time domain.

In step 100, a cyclic shift is performed on the signal from the FFT wherein data is shifted relative the time domain data resulting in a de rotated signal but with a moved quantization noise.

Figure 10:
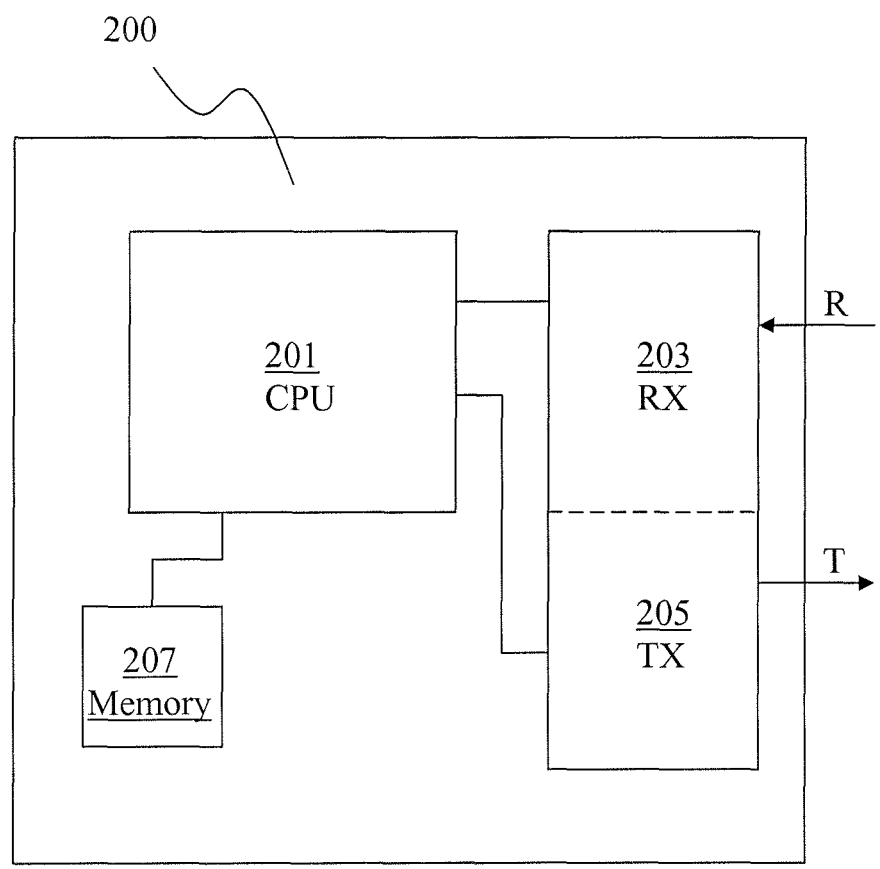
FIG. 10 shows a schematic overview of an electronic device.

In FIG. 10, a schematic overview of an electronic communication device 200 is shown. The electronic communication device 200 comprises a control unit 201 CPU connected to a memory 207 for storing data and reading data from. The electronic communication device 200 further comprises a receiving unit 203 RX arranged to receive a signal R from, for example, a wireless communication device or the like, and a transmitting unit 205 TX arranged to transmit a signal T to, for example, a wireless communication device, a base station and/or the like.

The electronic communication device 200 may be a wireless communication device, for example, a PDA, a mobile telephone or the like, a base station, an evolved NodeB, a combined RBS and RNC and/or the like.

The control unit 201 may be arranged to perform signal processing before transmitting the data comprising CRC generation, turbo coding, scrambling, modulation, mapping, IFFT and cyclic prefix insertion, in for example, downlink DL in LTE. In the uplink UL in LTE, the control unit 201 may be arranged to perform signal processing before transmitting the data comprising CRC generation, turbo coding, scrambling, modulation, DFT, mapping, IFFT and cyclic prefix insertion.

In order to transmit less fixed point quantization noise in OFDM and SC-FDMA signals the control unit 201 may be arranged to perform a cyclic shift after the IFFT. The data from the IFFT may be stored in the memory 207 and the cyclic shift may be performed by reading the stored data in a different order/different initial value than how it was stored. Furthermore, in embodiments the control unit 201 is arranged to perform an element wise multiplication on the data before the IFFT. The element wise multiplication means that the input signal to the IFFT is multiplied with a rotation sequence. The rotation sequence may be pre-calculated or the like by, for example, inputting a signal position vector corresponding to the cyclic shift into an FFT resulting in a rotation sequence, this, as well, may be performed by the control unit 201.

It should also be noted that the cyclic shift may be performed on the FFT in order to move regions of high quantization noise. Consequently, the element wise multiplication may be performed on the modulated signal.

In embodiments the control unit 201 may be arranged to perform signal processing on a received signal by performing the following steps, removing CP, performing FFT, extracting users from the signal, demodulating the signal, and decoding the signal. In order to prevent quantization noise from the Fourier transformation the control unit 201 may be arranged to perform a cyclic shift on the received signal after the FFT.

The data from the FFT may be stored in the memory 207 and the cyclic shift may be performed by reading the stored data in a different order/different initial value than how it was stored. Furthermore, in some embodiments the control unit 201 is arranged to perform an element wise multiplication on the data before the FFT. The element wise multiplication means that the input signal to the FFT is multiplied with a rotation sequence. The rotation sequence may be pre-calculated or the like by, for example, inputting a signal position vector corresponding to the cyclic shift into an IFFT resulting in a rotation sequence, this, as well, may be performed by the control unit 201.

The electronic communication device 200 may hence include means to move the quantization noise in received signal, means to move the quantization noise in a transmission signal or a combination thereof moving the quantization noise in both the received signal as well as the transmitted signal.

A parallel process may be implemented into the transmitting arrangement and/or the receiving arrangement.

Figure 11:
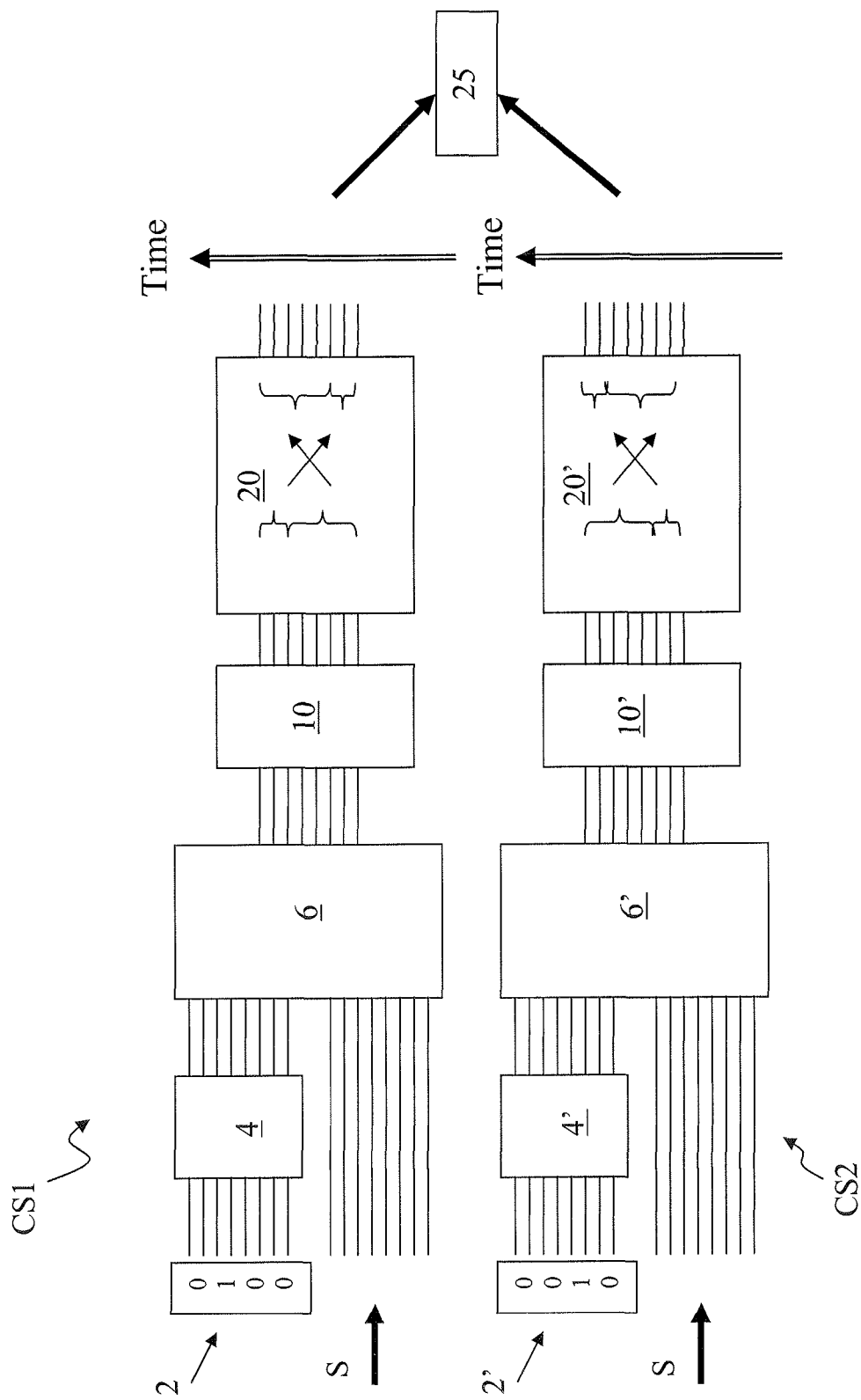
FIG. 11 shows a schematic overview of a parallel cyclic shift process in a transmitting arrangement.

In FIG. 11, an embodiment of a transmitting arrangement with a parallel process is shown. In a first cyclic shift arrangement CS1, a first position shift 2 is implemented into a first FFT 4, which in its turn is multiplied with an input signal S in a first element wise multiplier 6. The rotated signal is transformed in an IFFT 10 and the quantization noise is moved in a first cyclic shift process 20, resulting in a first shifted signal.

In a parallel second cyclic shift arrangement CS2, a second shift position 2' is implemented, this one being different than the first shift position 2, into a second FFT 4', which in its turn is multiplied with the input signal S in a second element wise multiplier 6'. The rotated signal is transformed in a second IFFT 10' and the quantization noise is moved in a second cyclic shift process 20', resulting in a second shifted signal.

The shifted signal from the first CS1 may then be combined in a combiner 25, wherein the noisy region/s in the first shifted signal is replaced with the similar regions of the second shifted signal from the second CS2. This results in a combined shifted signal where the regions of high quantization noise is eliminated/reduced.

Figure 12:
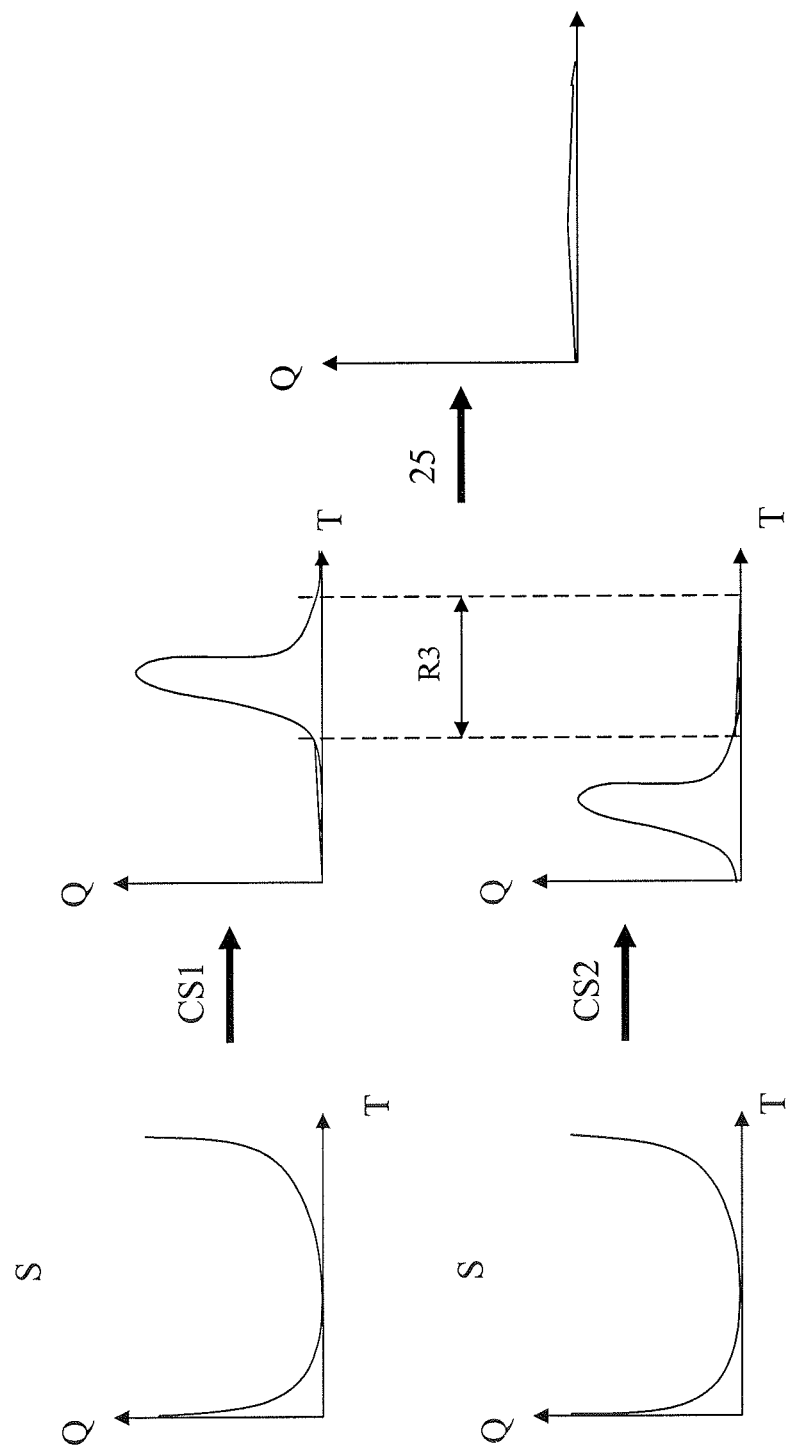
FIG. 12 shows a schematic overview of the signal being processed in a parallel cyclic shift process.

In FIG. 12, a schematic overview of a signal S that is processed in a parallel cyclic shift process is shown. The quantization noise regions in the signal after an IFFT is moved in the first CS1 and the second CS2, resulting in two signals with different regions of high quantization noise. The noisy region R3 of the first signal is then swapped/combined with the same region in the second signal in a combiner 25, but with a low quantization noise, resulting in a signal with low quantization noise all over the domain. The process will be similar in a receiving arrangement with a result of a low quantization noise over the frequency domain.

Figure 13:
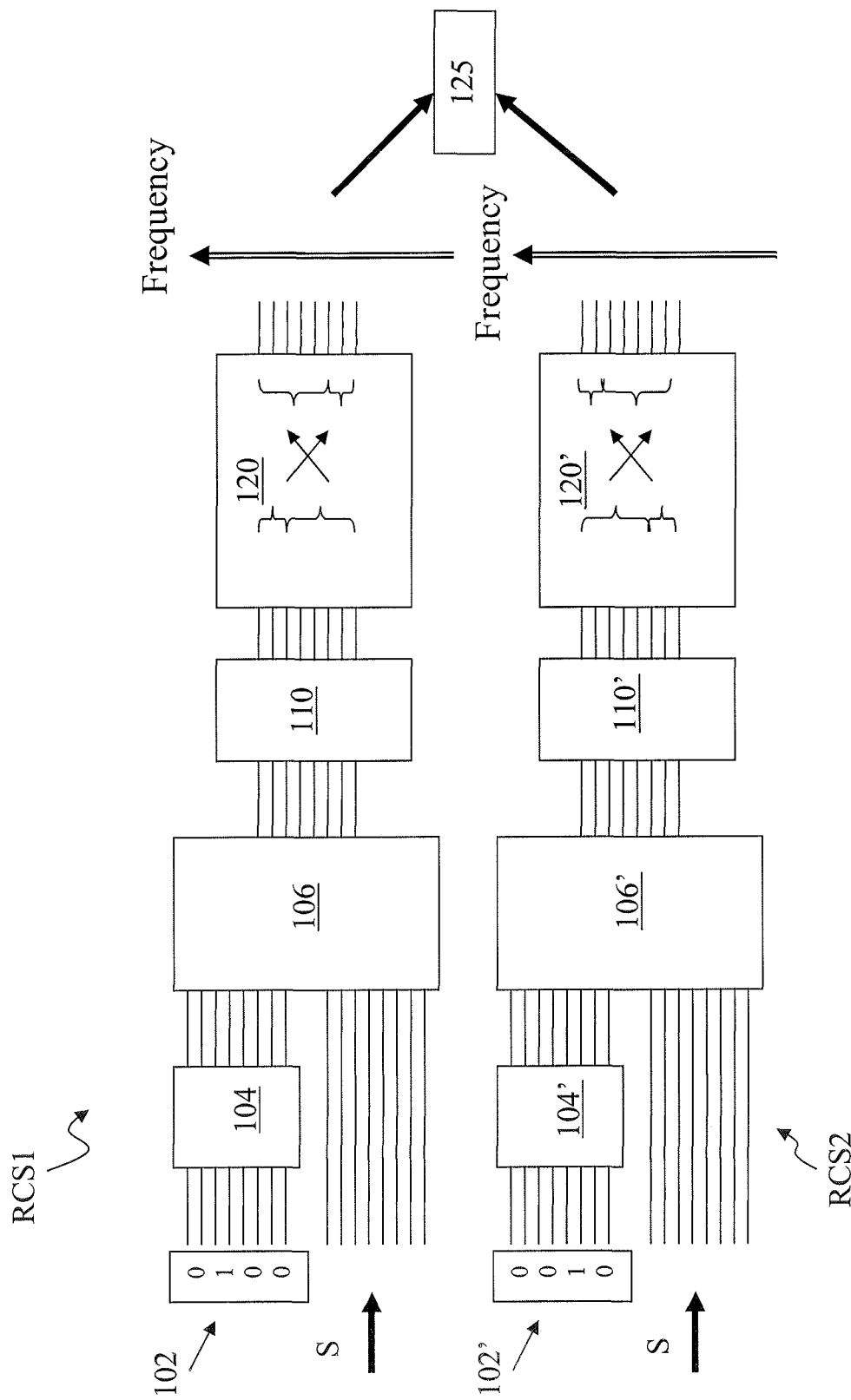
FIG. 13 shows a schematic overview of a parallel cyclic shift process on a received signal.

In FIG. 13, a schematic overview of an embodiment for processing a received signal with a parallel process is shown.

In a first receiving cyclic shift arrangement RCS1, a first position shift 102 is implemented into a first IFFT 104, which in its turn is multiplied with an input signal S in a first element wise multiplier 106. The rotated signal is transformed in an FFT 110 and the quantization noise is moved in a first cyclic shift process 120, resulting in a first shifted signal.

In a parallel second receiving cyclic shift arrangement RCS2, a second shift position 102' is implemented, this one being different than the first shift position 102, into a second IFFT 104', which in its turn is multiplied with the input signal S in a second element wise multiplier 106'. The rotated signal is transformed in a second FFT 110' and the quantization noise is moved in a second cyclic shift process 120', resulting in a second shifted signal.

The shifted signal from the first RCS1 may then be combined in a combiner 125, wherein the noisy region/s in the first shifted signal is replaced with the similar regions of the second shifted signal from the second RCS2. This results in a combined shifted signal where the regions of high quantization noise is eliminated/reduced.

Figure 14:
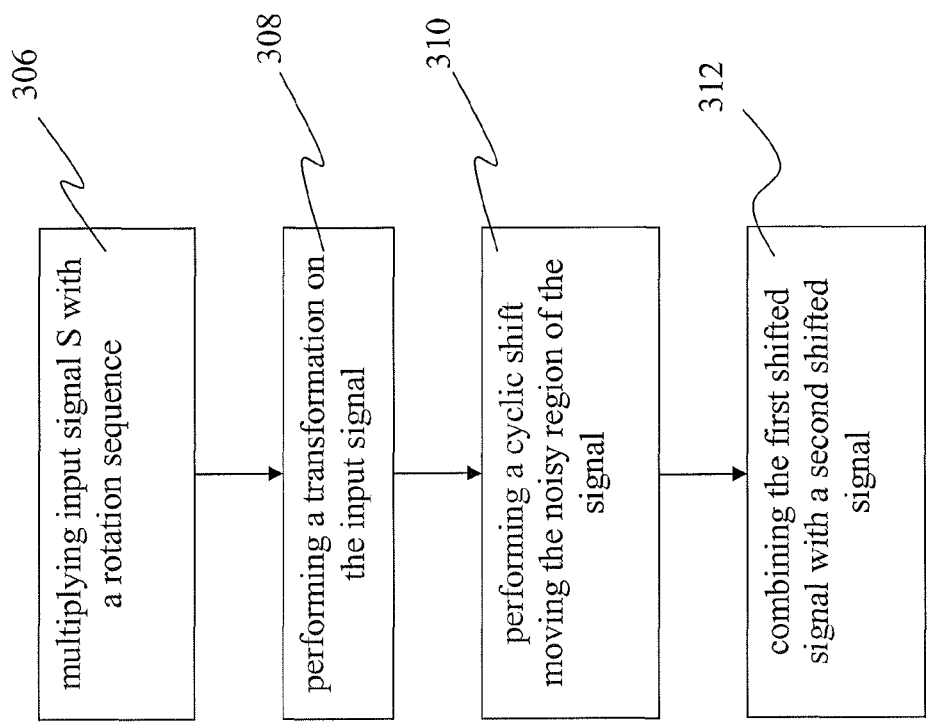
FIG. 14 shows a schematic flow chart of a method in an electronic communication device for processing a digital signal.

Referring to FIG. 14, embodiments disclose a method in an electronic communication device for processing a digital signal within a wireless communication network in order to transform the digital signal from a first domain representation to a second domain representation.

In optional step 306, the digital signal is multiplied with a rotation sequence in the first domain.

The rotation sequence may be calculated from an input of a selected shift position and a transformation from the second domain to the first domain.

The transformation in the calculation of the rotation sequence may comprise an FFT or an IFFT.

In step 308, the signal is transformed from the first domain to the second domain resulting in a signal of a first order of values with quantization noise in at least one area of the second domain.

The transforming step may comprise an Inverse Fourier Transformation, IFFT, wherein the first domain is a frequency domain and the second domain is a time domain.

Furthermore, the transforming step may comprise a Fast Fourier Transformation, FFT, wherein the first domain is a time domain and the second domain is a frequency domain.

In step 310, a cyclic shift is performed on the transformed signal to move the quantization noise in the second domain, resulting in a first shifted signal.

The cyclic shift may be performed by reading the transformed signal values in a second order being different than the first order.

In some embodiments, the signal is an OFDM signal and the signal may be shifted half the length of an OFDM symbol.

In optional step 312, the first shifted signal from a first cyclic shift process is combined with a second shifted signal from a second cyclic shift process by swapping a region in the second domain of the first shifted signal with a corresponding region in the second domain of the second shifted signal.

The second cyclic shift may be performed with a different rotation sequence, resulting in that the second shifted signal is being different than the first shifted signal.

Referring back to FIG. 9, in order to perform the method an electronic communication device 200 is provided. The electronic communication device comprises a receiving unit 203 arranged to receive data on a carrier signal and a control unit 201 arranged to process the carrier signal by transforming the carrier signal from a time domain to a frequency domain. The control unit 201 is further arranged to perform a first cyclic shift on the processed carrier signal resulting in a first shifted signal with quantization noise from the transforming moved in the frequency domain.

The control unit 201 may be arranged to multiply the carrier signal with a rotation sequence in the time domain. Furthermore, the control unit 201 may be arranged to calculate the rotation sequence by performing a Inverse Fast Fourier transformation from the frequency domain to the time domain with an input of a selected position shift.

The control unit 201 may further be arranged to perform a Fast Fourier Transformation to transform the signal from the time domain to the frequency domain.

In some embodiments, the control unit 201 may be arranged to perform a parallel signal process of the carrier signal by transforming the carrier signal from a time domain to a frequency domain and to perform a second cyclic shift on the processed carrier signal being different than the first cyclic shift, resulting in a second shifted signal and the control unit 201 is further arranged to combine the first shifted signal with the second shifted signal to swap a noisy region in the first shifted signal with a corresponding region in the second shifted signal.

The electronic communication device may further comprise a transmitting unit 205 arranged to transmit data on a second carrier signal and the control unit 201 is arranged to process the second carrier signal before transmission by transforming the second carrier signal from a frequency domain to a time domain and the control unit 201 is further arranged to perform a transmission cyclic shift on the processed second carrier signal and thereby move quantization noise from the transforming in the time domain, resulting in a first shifted transmission signal.

The control unit 201 may in some embodiments be arranged to multiply the second carrier signal with a rotation sequence in the frequency domain.

The control unit 201 may be arranged to calculate the rotation sequence by performing a Fast Fourier Transformation from the time domain to the frequency domain with an input of a selected shift position.

The control unit 201 may be arranged to perform an Inverse Fast Fourier Transformation to transform the signal from the frequency domain to the time domain.

The control unit may perform the steps as a application or a plurality of applications are executed on the control unit. The application/s may be stored on a local/external memory.

In some embodiments, an electronic communication device 200 is provided, wherein the control unit 201 is arranged to perform a parallel signal process on the second carrier signal by transforming the second carrier signal from a time domain to a frequency domain. The control unit 201 is further arranged to perform a second transmission cyclic shift of the processed second carrier signal being different than the first transmission cyclic shift, resulting in a second shifted transmission signal and to combine the first shifted transmission signal with the second shifted transmission signal to swap a noisy region in the first shifted transmission signal with a corresponding region in the second shifted transmission signal.

Furthermore, in order to perform methods on a transmitting signal an electronic communication device 200 is provided comprising a transmitting unit 205 arranged to transmit data on a carrier signal and a control unit 201 arranged to process the carrier signal before transmission by transforming the carrier signal from a frequency domain representation to a time domain representation. The control unit 201 is further arranged to perform a cyclic shift on the processed carrier signal and thereby move quantization noise from the transforming in the time domain, resulting in a first shifted transmission signal.

The cyclic shift may be performed by reading the transformed signal values in a second order being different than the first order.

The control unit 201 may be arranged to multiply the digital signal with a rotation sequence in the frequency domain.

The control unit 201 may further be arranged to calculate the rotation sequence by performing a Fast Fourier Transformation from the time domain to the frequency domain with an input of a selected shift position.

The control unit 201 may be arranged to perform an Inverse Fast Fourier Transformation to transform the carrier signal from the frequency domain to the time domain.

The control unit 201 may, in some embodiments, be arranged to perform a parallel signal process of the carrier signal by transforming the carrier signal from a time domain to a frequency domain and to perform a second cyclic shift on the processed carrier signal being different than the first cyclic shift, resulting in a second shifted transmission signal and the control unit 201 is further arranged to combine the first shifted transmission signal with the second shifted transmission signal to swap a noisy region in the first shifted signal with a corresponding region in the second shifted transmission signal.

The electronic communication device 200 may represent a mobile communication terminal and/or a radio base station.

In the drawings and specification, there have been disclosed exemplary embodiments of the invention. However, many variations and modifications can be made to these embodiments without substantially departing from the principles of the present invention. Accordingly, although specific terms are employed, they are used in a generic and descriptive sense only and not for purposes of limitation, the scope of the invention being defined by the following claims.

The invention claimed is:

1. A method in an electronic communication device for processing a digital signal within a wireless communication network in order to transform the digital signal from a first domain representation to a second domain representation, comprising the steps of:
    transforming a digital signal from a first domain to a second domain resulting in a transformed signal of a first order of values with quantization noise in at least one area of the second domain, and
    performing a cyclic shift by reading the values of the transformed signal in a different order than the first order of values to move the quantization noise in the second domain, thereby resulting in a first shifted signal.

2. The method according to claim 1, further comprising multiplying the digital signal with a rotation sequence in the first domain.

3. The method according to claim 2, wherein the rotation sequence is calculated from an input of a selected shift position and a transformation from the second domain to the first domain.

4. The method according to claim 3, wherein the transformation in calculating the rotation sequence comprises a Fast Fourier Transform (FFT).

5. The method according to claim 3, wherein the transformation in calculating the rotation sequence comprises an Inverse Fast Fourier Transform (IFFT).

6. The method according to claim 1, wherein the step of transforming comprises an IFFT, and the first domain is a frequency domain and the second domain is a time domain.

7. The method according to claim 1, wherein the step of transforming comprises a FFT, and the first domain is a time domain and the second domain is a frequency domain.

8. The method according to claim 1, wherein the transformed signal is an Orthogonal Frequency Division Multiplex (OFDM) signal and the transformed signal is shifted half the length of an OFDM symbol.

9. The method according to claim 1 further comprising combining the first shifted signal from a first cyclic shift process with a second shifted signal from a second cyclic shift process by swapping a region in the second domain of the first shifted signal with a corresponding region in the second domain of the second shifted signal.

10. The method according to claim 9, wherein the second cyclic shift is performed with a different rotation sequence, resulting in the second shifted signal being different than the first shifted signal.

11. An electronic communication device comprising:
    a receiving unit arranged to receive data on a carrier signal, and
    a control unit arranged to process the carrier signal by transforming the carrier signal from a time domain to a frequency domain to provide a transformed carrier signal and wherein the control unit is further arranged to perform a first cyclic shift by reading values of the transformed carrier signal in a different order resulting in a first shifted signal with quantization noise moved in the frequency domain.

12. An electronic communication device comprising:
    a transmitting unit arranged to transmit data on a carrier signal, and
    a control unit arranged to process the carrier signal before transmission by transforming the carrier signal from a frequency domain to a time domain to provide a transformed carrier signal and wherein the control unit is further arranged to perform a cyclic shift by reading values of the transformed carrier signal in a different order and thereby move quantization noise in the time domain, thereby resulting in a first shifted signal.

13. The electronic communication device according to claim 11, wherein the electronic communication device represents a mobile communication terminal.

14. The electronic communication device according to claim 11, wherein the electronic communication device represents a radio base station.

* * * * *